March 10, 1959 C. GABRIELSEN ET AL 2,877,076
ICE CREAM MERCHANDISING MACHINE
Filed July 30, 1953 5 Sheets-Sheet 1
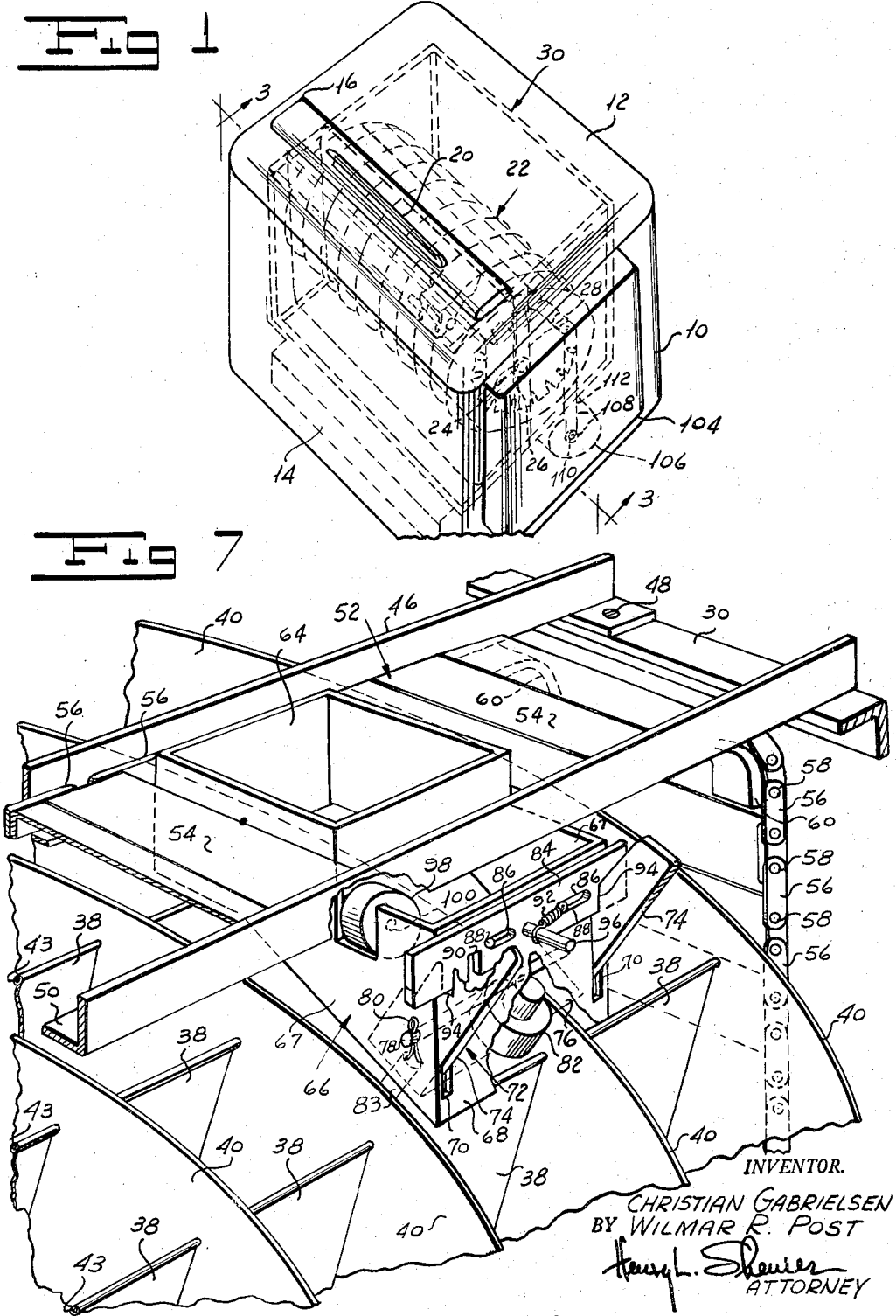
INVENTOR.
CHRISTIAN GABRIELSEN
BY WILMAR R. POST
ATTORNEY

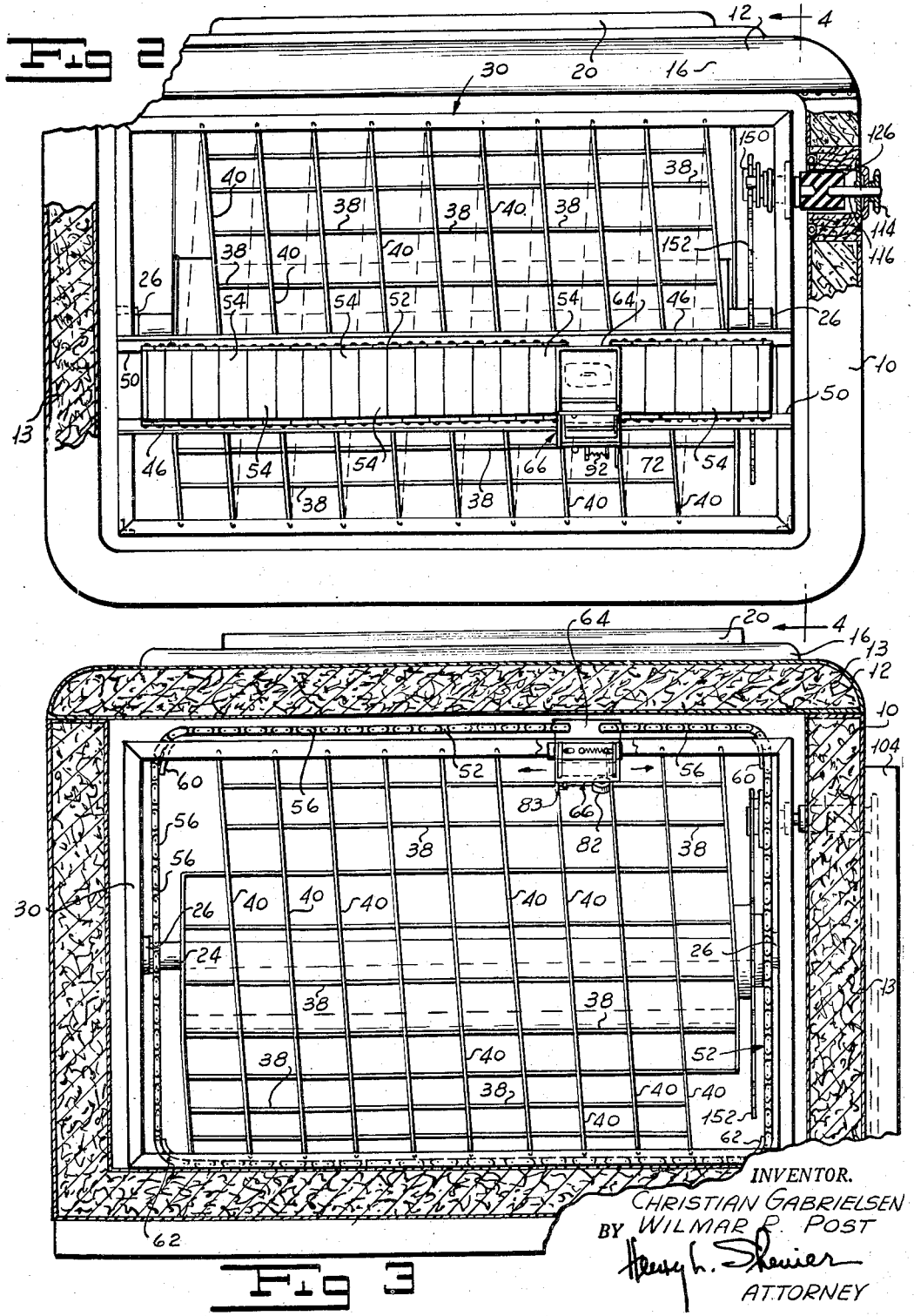

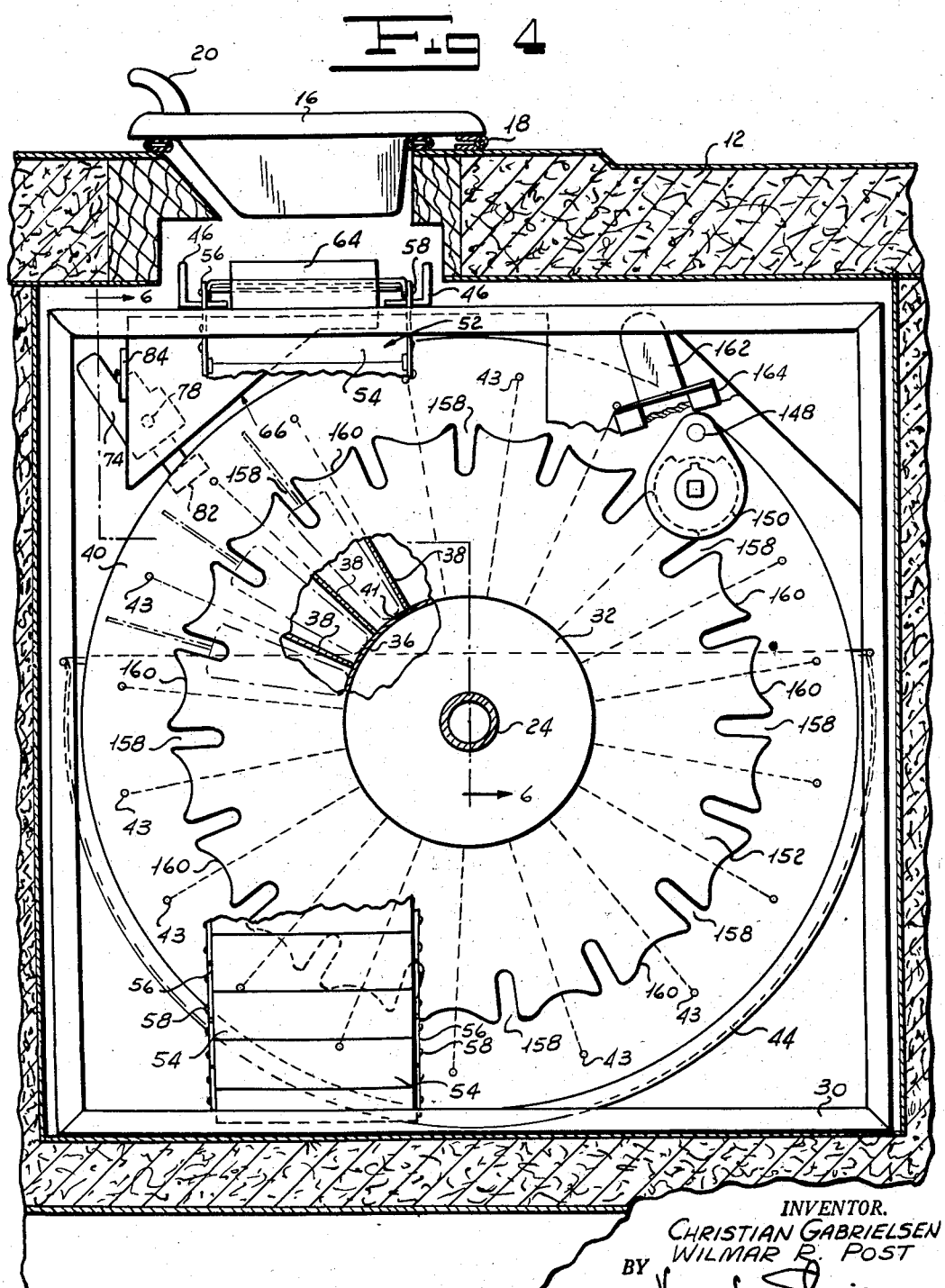

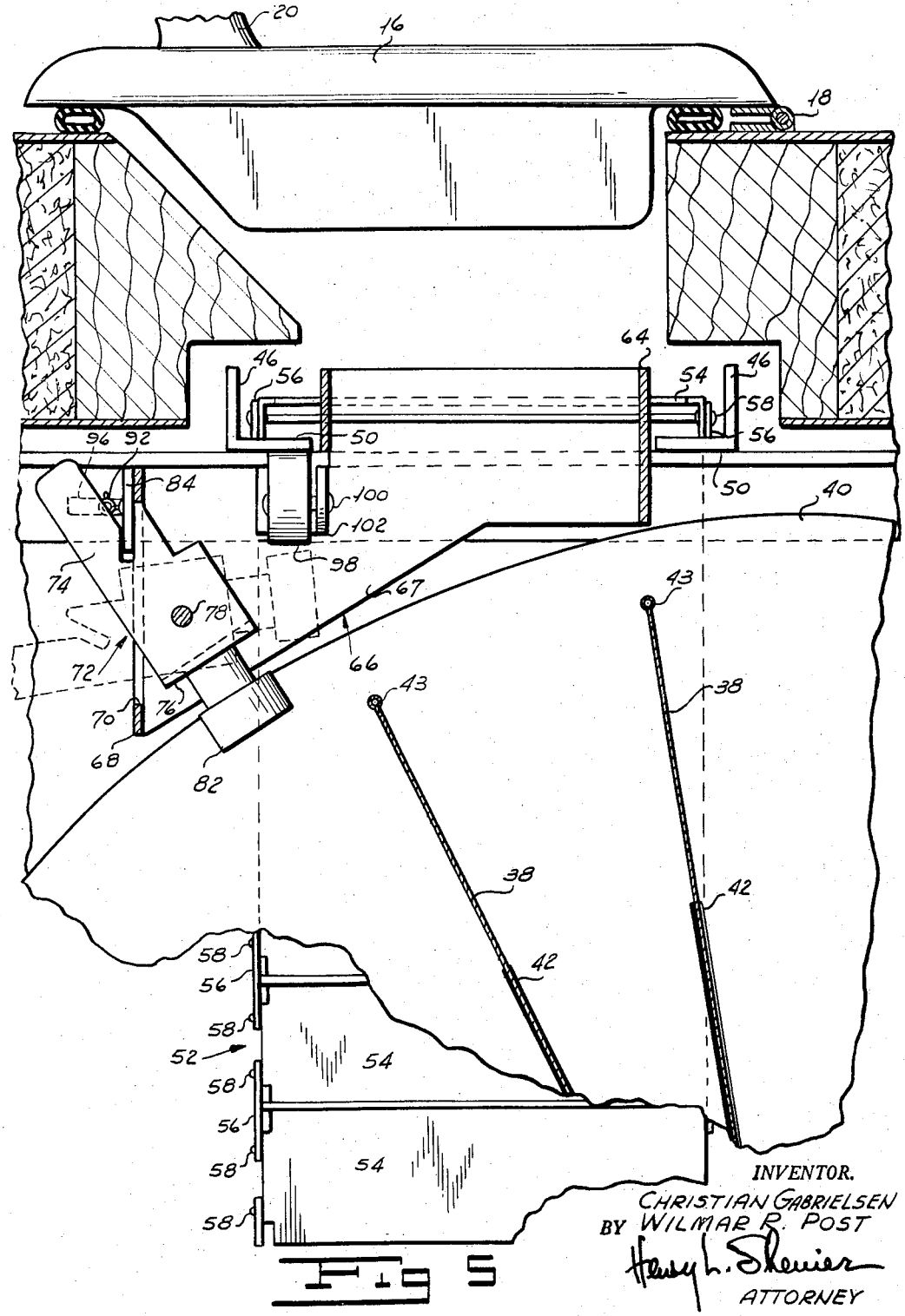

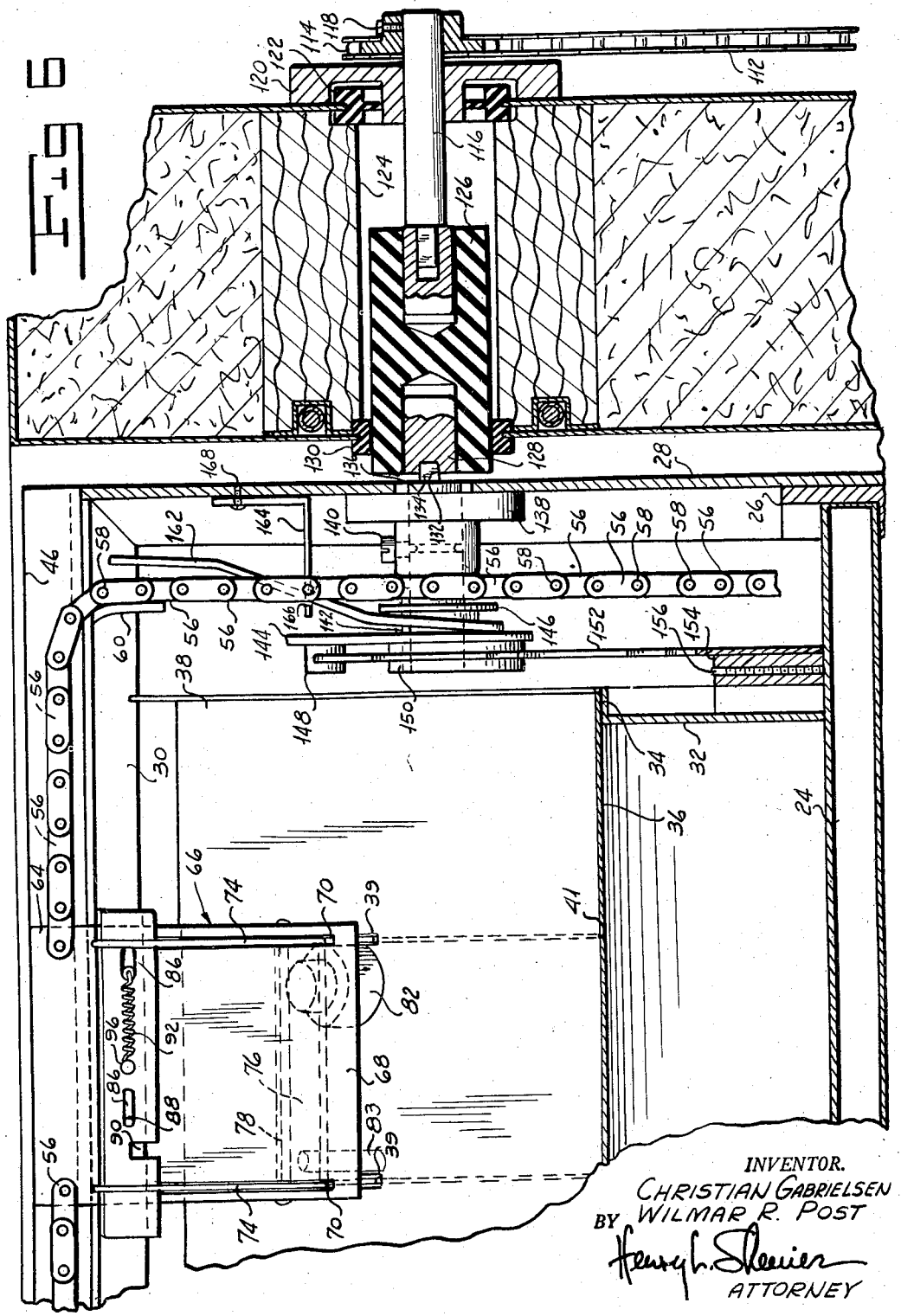

United States Patent Office 2,877,076
Patented Mar. 10, 1959

2,877,076

ICE CREAM MERCHANDISING MACHINE

Christian Gabrielsen, Mountain Lakes, and Wilmar R. Post, Dover, N. J., assignors to Rowe Manufacturing Co., Inc., Whippany, N. J., a corporation of New York Application July 30, 1953, Serial No. 371,268

9 Claims. (Cl. 312—97.1)

Our invention relates to merchandising machines and more particularly to an improved merchandising machine for ice cream or the like which is simple in construction, which has a small number of parts, which is certain in operation, and which has a large capacity for merchandise.

Ice cream, ices, and the like which are frozen on the end of a stick have become extremely popular. These and similar frozen comestibles, however, present peculiar problems when they are sold by merchandising machines. They must be kept continually under refrigeration and yet must be dispensed in a simple and expeditious manner. Because of their shape, such articles of merchandise are difficult to dispense. Machines of the prior art adapted to dispense such articles of merchandise are, consequently, complicated and expensive. It will be appreciated that in ordinary use, the machine must be cleaned frequently to maintain it in a sanitary condition. Cleaning also becomes necessary in the event failure of refrigeration results in a melt-down. Machines of the prior art are extremely hard to clean, are difficult to load, and have a small capacity for articles of merchandise.

Attempts have been made to provide increased capacity in machines of the prior art by utilizing groups of compartments, each group being associated with an individually actuatable access means. The compartments of a group are successively stepped to positions under the associated access means and the access means successively actuated to permit access to the compartments in the respective groups. It will be appreciated that such an arrangement is complicated and expensive.

We have invented an improved merchandising machine which is simple in construction, which has a minimum number of parts and which has a very large capacity for merchandise relative to the space occupied by the machine. Our improved machine is easy to load and can be simply disassembled to provide access to the parts of the machine whereby it may easily be cleaned. Moreover, a single opening provides successive access to every compartment in the machine.

One object of our invention is to provide an improved ice cream merchandising machine which has a large capacity relative to the space occupied by the machine.

Another object of our invention is to provide an improved ice cream merchandising machine which is convenient to load.

A further object of our invention is to provide an improved ice cream merchandising machine in which the merchandise-containing unit may be readily removed so that the machine may be easily cleaned.

A still further object of our invention is to provide an improved ice cream merchandising machine which is simple in construction, which has a small number of parts, and which is inexpensive to manufacture.

Other and further objects of our invention will appear from the following description.

In general, our invention contemplates the provision of an improved ice cream merchandising machine which includes a conventional freezing cabinet having the customary refrigeration equipment and a merchandise-containing drum having a plurality of radially extending compartments rotatably mounted on a framework within the cabinet. We arrange the drum compartments helically around the drum in the direction of the drum axis. The cover of the cabinet is provided with a longitudinally extending outer door which affords access to an axial row of the compartments of the drum. Below the door on guides or tracks which are attached to the frame, we mount a sectional cover belt or baffle for movement axially of the drum. One section of the belt is formed with a carriage having an opening such that when the outer door is open, access is had to only a single compartment on the drum. We provide drive means for rotatably stepping the drum around its axis on each dispensing operation through the arc occupied by one of the compartments. The carriage has means which engages the drum so that the cover belt and the access opening formed in the carriage are advanced longitudinally of the drum as the drum is stepped around its axis giving access to successive compartments in the drum in the direction of the helix. In addition, we provide means whereby the drum drive means may be disengaged and the carriage engaging means may be disengaged from the drum so that the drum can rotate freely for ease in loading.

In the accompanying drawings which form part of the instant specification and which are to be read in conjunction therewith and in which like reference numerals are used to indicate like parts in the various views:

Figure 1 is a perspective view of our improved ice cream merchandising machine.

Figure 2 is a top plan view on an enlarged scale of our improved ice cream merchandising machine with the cover open and with parts broken away.

Figure 3 is a sectional view on the same scale as in Figure 2 of our improved ice cream merchandising machine taken along the line 3—3 of Figure 1.

Figure 4 is a sectional view on an enlarged scale of our improved ice cream merchandising machine taken along the line 4—4 of Figure 2.

Figure 5 is a sectional view on a greatly enlarged scale of a portion of our improved ice cream merchandising machine showing the access door and the sectional belt carriage.

Figure 6 is a fragmentary sectional view on an enlarged scale of our improved ice cream merchandising machine showing the means for driving the drum.

Figure 7 is a perspective view on an enlarged scale of a portion of our improved ice cream merchandising machine showing the carriage structure for providing access to a drum compartment and the driving means therefor.

More particularly referring now to the drawings, we provide a freezing cabinet 10 with a hinged cover 12 and conventional refrigeration equipment 14 which will not be described in detail, since it is well known in the art and forms no part of our invention. The cabinet 10 and cover 12 are insulated with insulating material 13, as is also well known in the art. The cover 12 of the cabinet 10 is provided with a longitudinally extending outer door 16 mounted on a hinge 18 and having a handle 20 as can be seen by reference to Figures 4 and 5. A merchandise-containing drum, indicated generally by the reference character 22, is carried within housing 10 by a shaft 24, which is rotatably mounted in slot bearings 26 carried by brackets 28 on a framework, indicated generally by the reference character 30.

Referring now to Figures 4 to 6, shaft 24 has a disk 32 fixed adjacent each end by any suitable means such as welding or the like. Each of the disks 32 has a peripheral, axially extending flange 34 to which is secured, by welding or the like, a sheet metal tube 36. We form a plurality of merchandise-containing compartments around drum 22. A number of longitudinally extending, radial panels 38 to be mounted on drum 36 by any suitable means, such as welding or the like, are provided with spaced slots 39 which extend inwardly from the outer edges of the panels toward the axis of drum 36 approximately halfway through the panels, as can be seen by reference to Figure 6. A plurality of annular disks are provided with slots 42 for cooperation with slots 39 to form the compartments. Each of the disks is split along a radius. Slots 42 extend radially outwardly from center openings 41 of the disks for a distance approximately equal to the distance from the bottom of a slot 39 to the surface of drum 36, as can be seen by reference to Figure 5. The slots 39 and 42 in the respective panels and split disks are spaced so that when we interlock the disks with the panels 38 and mount the assembly on drum 36, each disk will form a single turn of a helix 40 in the direction of the drum axis. Successive disks form a continuous helix 40 in the direction of the axis of drum 36, as can be seen by reference to Figures 2 and 3. Referring now to Figure 5, we provide axially extending wires or rods 43 spaced radially with reference to tube 36 and passing through all the disks 40 to provide rigidity. The ends of the portions of panels 38 between successive disks are bent around rods 43. Rods 43 thereby serve to hold the helix 40 in place on the drum. Helix 40 may also be secured to the surface of drum 36 by welding or the like, if desired. It will be appreciated also that we space panels 38 radially around drum 36 and space the volutes of the helix 40 formed by successive disks along the drum so that we form compartments of the proper size to receive the articles of merchandise. It is to be noted that the periphery of helix 40 extends beyond the ends of the panels 38 so as to present a continuous helical surface in the direction of the axis of cylinder 36.

As can be seen in Figure 4, we mount a semicylindrical baffle 44 on the framework 30 below the drum 22 so that it surrounds the lower half thereof to prevent the articles of merchandise therein from falling out of their respective compartments.

It will be appreciated that the panels 38 and the helix 40 bound a plurality of helically disposed compartments extending in the direction of the axis of the drum.

Referring now to Figure 7, we mount a pair of flanged guide rails 46 on the framework 30 by appropriate means such as bolts 48. The horizontal flanges 50 of these rails carry a sectional belt forming a flexible baffle, indicated generally by the reference character 52. This belt 52 includes sections 54 joined by links 56 secured to the sections by pins 58. The belt 52 is continuous and extends from guide members 60 formed from horizontal flanges 50 of guide rails 46 downwardly, as viewed in Figure 3, around guides 62 carried by the frame 12 and thence back to guide rails 46.

It will be appreciated that we arrange the guide rails 46 and belt 52 so that the belt overlies an axial row of compartments on the drum 22. A carriage 64 is carried by belt 52 and is formed with an opening whereby access can be had to only a single compartment of the row under the cover belt, as can be seen by reference to Figure 7.

The carriage 64 is provided with a U-shaped extension, indicated generally by reference numeral 66, underlying one of the guide rails 46 and having a pair of legs 67 and a base 68. The base 68 of the extension 66 has a pair of slots 70 cut therein. A U-shaped bracket, indicated generally by the reference character 72, has a pair of legs 74 and a base 76. Bracket 72 is swingably mounted between the legs 67 of extension 66 on a rod 78 fixed to the legs 67 by cotter pins 80. The arrangement is such that legs 74 of bracket 72 extend through the slots 70 in base 68. The base 76 of bracket 72 carries a roller 82 such that when bracket 72 is in the position shown in Figure 7, roller 82 will engage the helical surface formed by the portions of disks 40 extending above the wires 43. We fix a pin 83 to the underside of base 76 at a point removed from roller 82 so that it engages the turn of the helical surface ahead of the turn engaged by roller 82. Pin 83 locates the carriage 64 over a compartment and prevents it from being manually advanced to the next compartment of an axial row.

Bracket 72 is swingably mounted on rod 78 so that it may swing to the broken line position shown in Figure 5. As will be evident from an examination of Figure 5, in this position the roller 82 will not engage the helix 40. To hold the bracket 72 in a position where roller 82 will engage the helix 40, we provide a locking slide 84 having longitudinal slots 86 by which it is carried on pins 88 on base 68. Locking slide 84 is provided with a notch 90 on its undersurface, as viewed in Figure 7. Each of the legs 74 is provided with a notch 94 for engagement with locking slide 84. A spring 92, fixed at one end to one of the pins 88 on base 68 and at the other end to a pin 96 on slide 84, normally urges the slide to the right as viewed in Figure 7, so that it will engage notches 94 and hold bracket 72 in a position where roller 82 will engage the helix 40. When slide 84 is pulled to the left, as viewed in Figure 7, its right end will clear notch 94 of the adjacent leg 74 and its slot 90 will be in a position where the left-hand leg 74 of bracket 72 may drop through slot 90. In this position of slide 84, bracket 72 can swing to the position shown in broken lines in Figure 5.

Referring now to Figures 5 and 7, a second roller 98 is carried on a pin 100 on an ear 102 formed in one of the legs 67 of extension 66. This roller 98 is in a position where it will engage the underside of horizontal flange 50 of one of the guide rails 46 and prevent any lifting of carriage 64.

The coin register associated with my merchandising machine may be of any suitable type such as the one disclosed in the copending application of Christian Gabrielsen and John F. Morrison, Serial No. 166,045, filed June 3, 1950, now Patent No. 2,677,450, dated May 4, 1954. A housing 104 is secured to the side of casing 10 by any suitable means and houses drive motor 106 having a shaft 108 to which is fixed a sprocket 110 which drives a chain 112, as can be seen in Figure 1. The coin register, which forms no part of the instant invention, may be arranged in any suitable location within housing 104 and adapted to initiate a dispensing cycle of the machine by starting motor 106 when coins in the proper amount are deposited therein.

Referring now to Figure 6, sprocket chain 112 drives sprocket 114 fixed on a shaft 116 by a screw 118. Shaft 116 is carried by a bearing 120 mounted in the wall of casing 10. A sealing ring 122, carried by the cabinet wall, seals one end of a bore 124 in the wall. Shaft 116 is coupled by a plastic coupling 126 to a second shaft 128. A second sealing ring 130 mounts the plastic coupling 126 within the bore 124. It will be appreciated that the second shaft 128 is in the freezing compartment and thus at a lower temperature than is shaft 116. The plastic coupling 126 and sealing rings 122 and 130 prevent excessive heat transfer between the shafts 116 and 128.

The drive shaft 116 is rotated once for each deposit of coins in the proper amount in the coin register. This is insured by any appropriate cam and switch means fixed on shaft 116. A suitable means for accomplishing this purpose is disclosed in our copending application, Serial No. 326,980, filed December 19, 1952, now Patent No. 2,672,389, dated March 16, 1954.

Shaft 128 has a transverse slot 132 cut in its end. A tongue 134 formed on the end of a shaft 136 mounted in a bearing 138 on bracket 28 by a screw 140 registers with slot 132 to provide a coupling between shaft 128 and shaft 136. Shaft 136 has a spline 142 formed along its length. A Geneva drive cam 144 is mounted on shaft 136 for rotation therewith by spline 142. A collar 146 is formed integrally with the drive cam 144. It will be appreciated that spline 142 mounts cam 144 and collar 146 for rotation with shaft 136 and permits the collar and cam to be slid along the length of the shaft. Geneva cam 144 is formed with a drive pin 148 and a lock member 150. The cam is arranged for cooperation with a Geneva wheel 152 fixed by its hub 154 to shaft 24 for rotation therewith by any suitable means such as a screw 156. As is well known in the art and as shown in Figure 4, Geneva wheel 152 is formed with alternate notches 158 and scallops 160. Geneva cam 144 and wheel 152 provide an intermittent motion which steps drum 22 through a predetermined angle of rotation. The angle of rotation is determined by the number of notches in wheel 152. The arrangement is such that each movement of the Geneva wheel during a dispensing operation will rotate the drum through an arc which is subtended by one compartment on the drum.

Referring now to Figure 6, a bifurcated lever 162 rests with its forked end surrounding collar 146 and extends through a slot 166 in a bracket 164 secured to bracket 28 on frame 30 by means such as screws 168. When lever 162 is pivoted in the slot 166 in a counterclockwise direction, collar 146 and Geneva cam 144 will be slid to the right along shaft 136 so that the Geneva cam does not engage the wheel 152. Thus the drum may be manually freed from its drive.

In use, when a customer activates the coin register by inserting the proper amount in coins therein, the circuit of motor 106 will be completed for one rotation of the motor shaft 108. Sprocket wheel 110 drives shaft 116 through chain 112 and sprocket 114. Shaft 116 drives shaft 136 through one cycle of rotation such that Geneva cam 144 rotates in a clockwise direction, as viewed in Figure 4. Drive pin 148 engages a notch 158 to rotate wheel 152 and advances drum 22 through an angle such that the drum is stepped one compartment in a counterclockwise direction as viewed in Figure 4. At the end of its rotation, the lock member 150 of cam 144 engages a scallop 160 to stop the rotation of the drum. The customer lifts door 16 and through the opening in carriage 64 gains access to the merchandise contained in the compartment immediately below the opening.

On the succeeding dispensing operation, the drum is again stepped in the manner described in the preceding paragraph. As the drum rotates in a counterclockwise direction as viewed in Figure 4, the portion of the helix 40 above panel 38 which engages roller 82 will move carriage 64 and belt 52 a slight amount to the left as viewed in Figures 2, 3, and 7, so that the opening in carriage 64 lies immediately over the next succeeding compartment which was emptied in the preceding dispensing operation. It will be appreciated that on each succeeding dispensing operation, as the drum is stepped, carriage 64 will be moved slightly to the left as viewed in Figures 2 and 3 so that its opening will always register with the compartment which has been brought under the opening. It is to be understood also that pin 83 prevents a customer from manually moving carriage 64 to the next compartment of an axial row after a dispensing operation. A machine will not be emptied until carriage 64 has been brought over each of the compartments on the drum in its movement from right to left as viewed in Figure 2 as the drum is stepped around. Thus the necessity for a number of openings, doors and the like for gaining access to the compartments has been eliminated. A single opening is adapted to register with every compartment on the drum as the merchandise is dispensed to empty the machine. The carriage is always automatically registered to bring the belt or baffle opening over a compartment.

When it is desired to load the machine, lever 162 is rotated in a counterclockwise direction as viewed in Figure 6 to disengage the drum from its drive means by moving cam 144 to a position where it cannot engage wheel 152. We then slide locking link 84 to the left as viewed in Figure 7 to free bracket 72 and allow it to fall to a position where its roller 82 cannot engage the helix 40. This is the position of roller 82 illustrated in broken lines in Figure 5. It will be appreciated that the drum 22 may now be freely rotated and the compartments simply and expeditiously loaded without interfering with the drive means. To place the machine in a condition where it will be ready to operate, carriage 64, which has moved all the way to the left as viewed in Figure 2 in emptying the machine, is slid all the way to the right and roller 82 locked in place by slide 84. Lever 162 is then rotated clockwise as viewed in Figure 6 to re-engage cam 144 with wheel 152 and the machine is ready to operate.

It will be appreciated that a food dispensing machine must be frequently cleaned in ordinary use. To clean our machine, the cover 12 of the casing is raised and the entire drum unit easily lifted from its bearings 26 for ease in maintaining our machine in a clean and sanitary condition.

Thus it will be seen that we have accomplished the objects of our invention. We have provided an improved merchandising machine which is adapted to dispense ice cream, ices and other similar frozen comestibles, which has a very large capacity relative to the space occupied by the machine. Our machine is simple in construction and employs a small number of parts so that it is easy to manufacture and simple and certain in operation. A single opening provides successive access to every compartment on the drum. The arrangement is such that the drive means may be disengaged to release the drum for free rotation so that the machine may easily be loaded. In addition, the merchandise-containing unit of our machine may be lifted out of the freezer cabinet so that it may readily be cleaned.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is therefore to be understood that our invention is not to be limited to the specific details shown and described.

Having thus described our invention, what we claim is:

1. A coin controlled machine for dispensing merchandise including in combination a cabinet, a drum, means for rotatably mounting said drum within said cabinet, a plurality of compartments formed in said drum, said compartments being disposed along the locus of a helix in the direction of the drum axis, a flexible belt, means mounting said belt for movement axially of said drum, a carriage formed with an opening carried by said belt, drive means for rotating said drum through a predetermined angle on each dispensing operation, and means responsive to the rotation of said drum for advancing said belt axially of the drum.

2. A merchandising machine as in claim 1 wherein said means for advancing the belt axially comprises a bracket mounted on said carriage, a roller carried by said bracket, and means formed on said drum for engagement with said roller.

3. A merchandising machine as in claim 1 wherein said means for advancing the belt axially comprises a bracket swingably mounted on said carriage, a roller carried by said bracket, means formed on said drum for engagement with said roller, and locking means for locking the bracket in a position where said roller engages the means formed on the drum, said locking means being adapted to be moved out of engagement with said bracket whereby said bracket swings to a position where said roller does not engage said means formed on the drum.

4. A merchandising machine as in claim 1 wherein said compartments are formed with side walls and said means for advancing the belt includes the side walls of said compartments, said side walls being disposed along the locus of a helix in the direction of the drum axis, and means for positioning said carriage between a pair of adjacent side walls.

5. A merchandising machine as in claim 1 wherein said drive means comprises a Geneva wheel secured to said drum for rotation therewith, a drive shaft, a Geneva cam for driving said Geneva wheel, means slidably mounting said Geneva cam on said shaft for rotation therewith, and means for sliding said cam along said shaft so that it may selectively be moved into or out of engagement with said wheel.

6. A merchandising machine as in claim 1 including means for removably mounting said drum for rotation within said cabinet.

7. A coin controlled machine for dispensing merchandise including in combination a cabinet, a drum, means for rotatably mounting said drum within said cabinet, a plurality of merchandise-containing compartments having side walls formed on said drum, said side walls being disposed along the locus of a helix in the direction of the drum axis, a belt, means mounting said belt for movement axially of said drum, a carriage formed with an opening carried by said belt, drive means for rotating said drum through a predetermined angle on each dispensing operation, and means carried by said carriage for engagement with said helically disposed side walls to advance the belt when the drum is rotated during a dispensing operation.

8. A coin controlled machine for dispensing merchandise including in combination a housing, a drum, means for rotatably mounting the drum in the housing, a plurality of radially extending compartments for holding merchandise formed in the drum, a cover for the housing formed with an elongated slot extending parallel to the axis of drum rotation to give access to a row of drum compartments, a flexible baffle, means for movably mounting the baffle within the housing below the slot to prevent access to the row of compartments, said baffle being formed with an opening to give access to a single compartment, means for rotating the drum to bring successive compartments underneath the baffle opening, and means responsive to the rotation of the drum for moving the baffle axially a predetermined amount as the drum is rotated to maintain the baffle opening in register with successive drum compartments which contain merchandise.

9. A coin controlled machine for dispensing merchandise including in combination a cabinet, a drum, means rotatably mounting the drum in a fixed position within said cabinet, a plurality of merchandise-containing compartments formed in the drum, said compartments being disposed along the locus of a helix having an axis coincident with the axis of rotation of the drum, means formed with an opening the size of a compartment for providing access to a compartment of said drum, means mounting said access-providing means for movement axially of said drum, means for stepping said drum through a predetermined rotation upon successive operations of the machine, and movable means responsive to the operation of said drum for moving said access-providing means to afford access to successive compartments in the direction of the helix upon successive operations of the machine.

References Cited in the file of this patent

UNITED STATES PATENTS

| 1,696,795 | Cutler | Dec. 25, 1928 |
| 1,820,671 | McCormick | Aug. 25, 1931 |
| 2,678,251 | Stewart | May 11, 1954 |

FOREIGN PATENTS

| 6,560 | Great Britain | 1900 |
| 192,714 | Great Britain | 1923 |
| 380,926 | Great Britain | 1932 |